(12) United States Patent  (10) Patent No.: US 7,584,996 B2
Cartwright  (45) Date of Patent: Sep. 8, 2009

(54) STEERING COLUMN MEMORY MECHANISM

(75) Inventor: Mark A. Cartwright, West Lafayette, IN (US)

(73) Assignee: TRW Automotive U.S. LLC, Livonia, MI (US)

( * ) Notice: Subject to any disclaimer, the term of this patent is extended or adjusted under 35 U.S.C. 154(b) by 271 days.

(21) Appl. No.: 11/440,637

(22) Filed: May 25, 2006

(65) Prior Publication Data

US 2007/0273136 A1  Nov. 29, 2007

(51) Int. Cl.
  *B62D 1/184* (2006.01)
  *B62D 1/18* (2006.01)
(52) U.S. Cl. .......................... 280/775; 280/779; 74/493
(58) Field of Classification Search ................. 280/775, 280/779, 731; 74/493, 495
  See application file for complete search history.

(56) References Cited

U.S. PATENT DOCUMENTS

| | | | | |
|---|---|---|---|---|
| 5,361,646 A | * | 11/1994 | Venable | 74/531 |
| 5,363,716 A | * | 11/1994 | Budzik et al. | 74/493 |
| 5,439,252 A | * | 8/1995 | Oxley et al. | 280/775 |
| 5,507,521 A | * | 4/1996 | Steffens, Jr. | 280/775 |
| 6,604,439 B2 | * | 8/2003 | Gaukel | 74/493 |
| 6,952,979 B2 | | 10/2005 | Cartwright et al. | |

* cited by examiner

*Primary Examiner*—Paul N Dickson
*Assistant Examiner*—Nicole Verley
(74) *Attorney, Agent, or Firm*—Tarolli, Sundheim, Covell & Tummino LLP (57) ABSTRACT

A steering column (10) includes a steering column member (12) connectable with a steering wheel and rotatable to turn steerable vehicle wheels. A support (24), through which the steering column member (12) extends, is connected with a mounting bracket (54). The support (24) is movable relative to the mounting bracket (54) through a first range of motion into any one of a plurality of positions. The support (24) has a first position relative to the mounting bracket (54). A locking mechanism (80) locks the support (24) in any one of the plurality of positions relative to the mounting bracket (54). A memory mechanism (130) defines a memory position of the support (24) relative to the mounting bracket (54). The memory mechanism (130) guides movement of the support (24) relative to the mounting bracket (54) through a second range of motion smaller than the first range of motion between the first position and the memory position. The memory mechanism (130) has a first position in which the support (24) is movable relative to the mounting bracket (54) into any one of the plurality of positions relative to the mounting bracket (54). The memory mechanism (130) has a second position in which the support (24) is only movable relative to said mounting bracket (54) between the first position and the memory position.

45 Claims, 3 Drawing Sheets

Fig.1

STEERING COLUMN MEMORY MECHANISM

FIELD OF THE INVENTION

The present invention relates to an adjustable steering column, and more specifically, to a memory mechanism for an adjustable steering column.

BACKGROUND OF THE INVENTION

An adjustable steering column for a vehicle generally includes a steering column member connectable with a steering wheel. The steering column member extends through a support. A locking mechanism locks the support in any one of a plurality of positions relative to a mounting bracket. An operator of the vehicle may move the support to a desired position relative to the mounting bracket. The operator may move the support from the desired position for easy egress from and entry into the vehicle. The steering column does not include a mechanism for easily returning the support to the desired position relative to the mounting bracket.

SUMMARY OF THE INVENTION

A steering column of the present invention includes a steering column member connectable with a steering wheel and rotatable to turn steerable vehicle wheels. A mounting bracket connects the steering column to a vehicle frame. A support, through which the steering column member extends, is connected with the mounting bracket. The support supports the steering column member for rotation about a longitudinal axis of the steering column member and is movable relative to the mounting bracket. The support is movable relative to the mounting bracket into any one of a plurality of positions. The support has a first position relative to the mounting bracket. The first position is one of the plurality of positions. A locking mechanism locks the support in any one of the plurality of positions relative to the mounting bracket.

A memory mechanism defines a memory position of the support relative to the mounting bracket. The memory position may be any one of the plurality of positions of the support relative to the mounting bracket. The memory mechanism guides movement of the support relative to the mounting bracket between the first position and the memory position. The memory mechanism has a first position in which the support is movable relative to the mounting bracket into any one of the plurality of positions relative to the mounting bracket. The memory mechanism has a second position in which the support is only movable relative to the mounting bracket between the first position and the desired position.

In another aspect of the present invention, a first mechanism defines a first range of motion of the support relative to the mounting bracket. A second mechanism defines a second range of motion of the support relative to the mounting bracket. The second range of motion is smaller than the first range of motion. The second mechanism has a first position in which the support is movable relative to the mounting bracket through the entire first range of motion and a second position in which the support is movable relative to the mounting bracket only through the second range of motion.

BRIEF DESCRIPTION OF THE DRAWINGS

The foregoing and other features of the present invention will become apparent to one skilled in the art to which the present invention relates upon consideration of the following description of the invention with reference to the accompanying drawings, in which.

DESCRIPTION OF THE INVENTION

Figure 1:
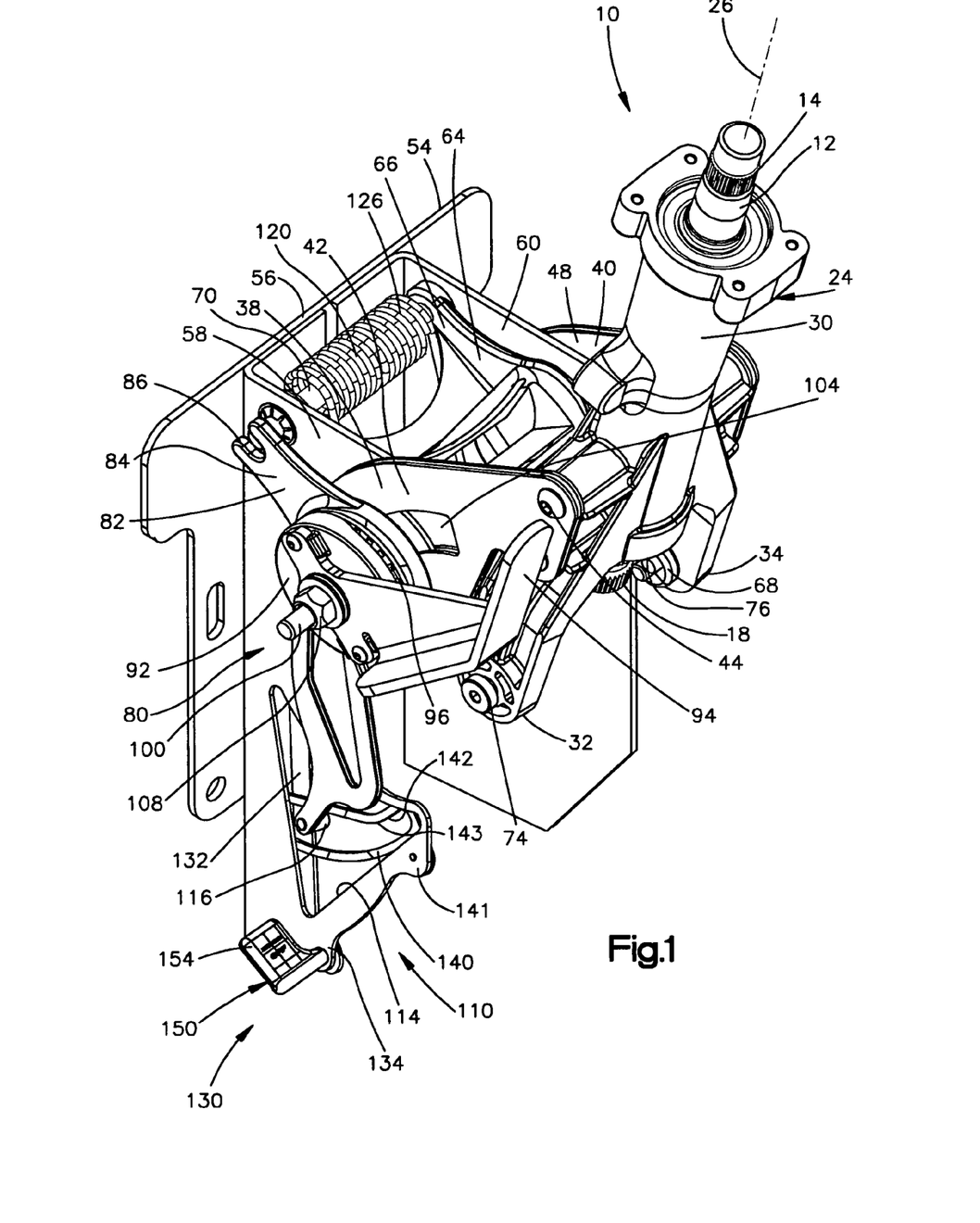
FIG. 1 is a schematic pictorial view of an exemplary steering column constructed in accordance with the present invention.

A vehicle steering column 10 is illustrated in FIG. 1. The steering column 10 may be generally similar to the steering column described in U.S. Pat. No. 6,952,979, which is incorporated herein by reference in its entirety. The steering column 10 includes a rotatable steering column member 12 to turn steerable vehicle wheels (not shown). The steering column member 12 has an end 14 connectable with a steering wheel (not shown) in any suitable manner. An end 18 of the steering column member 12 opposite from the end 14 is connectable with a universal joint (not shown). The universal joint connected with the end 18 of the steering column member 12 is connectable with a mechanism designed to transmit movement of the steering column member to a steering gear and permit movement of the steering column member relative to the mechanism, in any suitable manner.

A support 24 supports the steering column member 12 for rotation about a longitudinal axis 26 of the steering column member. Upon rotation of the steering wheel, the steering column member 12 rotates about the longitudinal axis 26. Upon rotation of the steering column member 12 about the longitudinal axis 26, steerable vehicle wheels (not shown) are turned in any suitable manner.

The support 24 (FIG. 2) may have a tubular portion 30 with a passage through which the steering column member 12 extends. Arm portions 32 and 34 may extend from the tubular portion 30. The tubular portion 30 may be made by casting and may have any desired shape. Bearings in the support 24 may support the steering column member 12 for rotation relative to the support.

Figure 2:
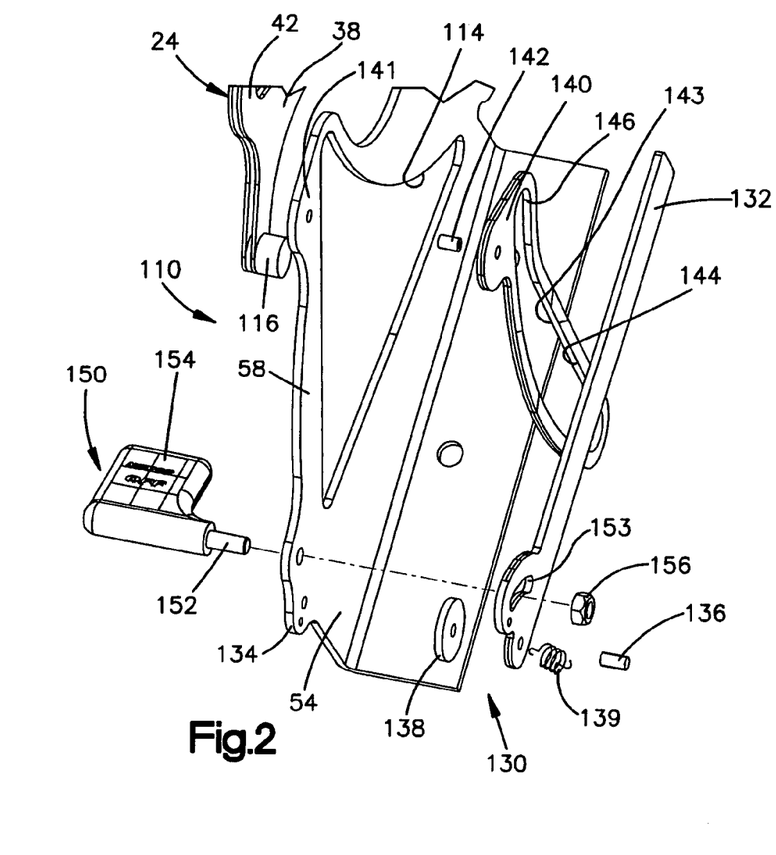
FIG. 2 is an exploded view of a first exemplary embodiment of a memory mechanism of the steering column of FIG. 1.

The support 24 may include locking portions 38 and 40 extending axially from opposite sides of the tubular portion 30. The locking portion 38 may include a plurality of plates 42 fixedly connected to each other with spacers between them. Although the locking portion 38 is shown as having two plates, it is contemplated that the locking portion may include any desired number of plates. The locking portion 38 may be fixedly connected to the tubular portion 30 by fasteners 44, such as screws.

The locking portion 40 may be identical to locking portion 38 and therefore, will not be described in detail. The locking portion 40 may include a plurality of plates 48 fixedly connected to each other with spacers between them. Although the locking portion 40 is shown as having two plates, it is contemplated that the locking portion may include any desired number of plates. The locking portion 40 may be fixedly connected to the tubular portion 30 by fasteners (not shown), such as screws.

A mounting bracket 54 (FIGS. 1 and 2) may connect the steering column 10 with a vehicle frame. The mounting bracket 54 may include a rear wall 56. Side walls 58 and 60 may be connected to the rear wall 56. The side walls 58 and 60 may extend generally perpendicular to the rear wall 56 and parallel to each other. The mounting bracket 54 may be connected to the vehicle frame by fasteners (not shown), such as bolts.

A pivot member 64 (FIG. 2) may interconnect the support 24 and the mounting bracket 54. The pivot member 64 may have a pair of arms 66 (one of which is shown in FIG. 1) extending from one side of the pivot member toward the rear wall 56. The arms 66 may be pivotally connected to the side walls 58 and 60. A pair of arms 68 (one of which is shown in FIG. 1) extending from an opposite side of the pivot member 64 away from the rear wall 56 may be pivotally connected with the support 24.

A pivot shaft 70 may extend through the arms 66 of the pivot member 64. The shaft 70 may be received in openings in the side walls 58 and 60 to pivotally connect the pivot member 64 to the mounting bracket 54. Accordingly, the pivot member 64 may pivot relative to the mounting bracket 54.

A pin 74 (FIG. 2) may pivotally connect one of the arms 68 of the pivot member 64 to the support 24. The pin 74 may extend through an opening in the arm portion 32 of the support 24 and into an opening in the arm 68 (not shown). A pin 76 may pivotally connect the other arm 68 of the pivot member 64 with the arm portion 34 of the support 24. The pin 76 may extend through an opening in the arm portion 34 of the support 24 and into an opening in the other arm 68. Accordingly, the support 24 may pivot relative to the pivot member 64.

An exemplary locking mechanism 80 (FIG. 1) may lock the pivot member 64 in any one of a plurality of pivot positions relative to the mounting bracket 54. The locking mechanism 80 may also lock the support 24 in any one of a plurality of pivot positions relative to the pivot member 64. The locking mechanism 80 may apply a force to clamp the side wall 58 between the pivot member 64 and the locking portion 38 of the support 24. The locking mechanism 80 may also clamp the side wall 60 between the pivot member 64 and the locking portion 40 of the support 24.

The locking mechanism 80 may include a first cam 82 engaging the locking portion 38 of the support 24. The cam 82 may have a cam surface facing away from the locking portion 38. The cam 82 may also include a radially extending arm 84 with a recess 86. The pivot shaft 70 may extend into the recess 86 in the cam 82 to prevent rotation of the cam 82 relative to the mounting bracket 54.

The locking mechanism 80 may include a second cam 92 rotatable relative to the cam 82. The cam 92 may have a cam surface facing the cam surface on the cam 82. A manually engageable actuator member 94 may be connected to the cam 92 for rotating the cam 92 relative to the cam 82. It is contemplated that an air cylinder assembly may be used to rotate the cam 92 relative to the cam 82. It is contemplated that any suitable mechanism may be used to rotate the cam 92 relative to the cam 82.

A bearing 96 may engage the cam surfaces on the first and second cams 82 and 92 and be rotatable relative to the cams. The bearing 96 may include a flexible cage and a plurality of bearing members rotatable relative to the cage. The bearing members may engage the cam surfaces on the cams 82 and 92.

A locking shaft 100 may extend through slots (not shown) in the plurality of plates 48 of the locking portion 40 and through the side wall 60 of the mounting bracket 54 and be prevented from rotating relative to the locking portion and the side wall. The pivot member 64 may have a slot through which the locking shaft 100 extends to permit movement of the pivot member relative to the locking shaft. The locking shaft 100 may also extend through the side wall 58 and slots 104 in the plurality of plates 42 of the locking portion 38 of the support 24 and be prevented from rotating relative to the side wall and the locking portion. The locking shaft 100 may extend through an opening in the cam 82, the bearing 96, and an opening in the cam 92 so that the cam 92 is rotatable relative to the locking shaft. A nut 108 may be threaded onto the locking shaft 100.

The cam 92 may be rotated about the locking shaft 100 relative to the cam 82. When the cam 92 is in a first position relative to the cam 82, the locking mechanism 80 clamps the support 24 to the mounting bracket 54. When the cam 92 is rotated relative to the cam 82 to a second position the support 24 is movable relative to the mounting bracket 54. When the support 24 moves relative to the mounting bracket 54, the locking shaft 100 may be prevented from moving relative to the mounting bracket.

A first mechanism 110 may define a first range of motion of the support 24 relative to the mounting bracket 54. The mechanism 110 may include an opening 114 in the side wall 58 (FIG. 2) of the mounting bracket 54 into which a guide portion 116 of the support 24 extends. The guide portion 116 may engage surfaces defining the opening 114 to define the limits of movement of the support 24 relative to the mounting bracket 54. The opening 114 may have any desired shape. Accordingly, the opening 114 may define the first range of motion of the support 24 relative to the mounting bracket 54. It is contemplated that any suitable mechanism may be used to define the first range of motion.

A spring member 120 (FIG. 1) may urge the support 24 toward a first position, such as an out of the way storage position, relative to the mounting bracket 54. The guide portion 116 of the support 24 may be located a maximum distance away from the rear wall 56 when the support is in the storage position. The spring member 120 may move the support 24 to the first position when the locking mechanism 80 is in the second position. It is contemplated that the first position of the support 24 may be any desired position.

The spring member 120 may have end portions that engage the rear wall 56 of the mounting bracket 54. The spring member 120 may have opposite end portions that engage the arm portions 32 and 34 of the support 24 to urge the support toward the out of the way position. The pivot shaft 70 may extend through coil portions 126 of the spring member 120 to connect the spring member to the mounting bracket 54. It is contemplated that any system may be used for urging the support 24 toward a first position.

The support 24 may be prevented from moving relative to the mounting bracket 54 when the cam 92 is in the first position relative to the cam 82. The support 24 may be moved relative to the mounting bracket 54 when the cam 92 is rotated about the locking shaft 100 relative to the cam 82 from the first position to the second position. After the support 24 is moved to a desired position, the cam 92 is rotated relative to the cam 82 from the second position to the first position to prevent the support from moving from the desired position. It is contemplated that any mechanism may be used to rotate the cam 92 relative to the cam 82. Furthermore, it is contemplated that any desired locking mechanism may be used to prevent movement of the support 24 relative to the mounting bracket 54.

Figure 3:
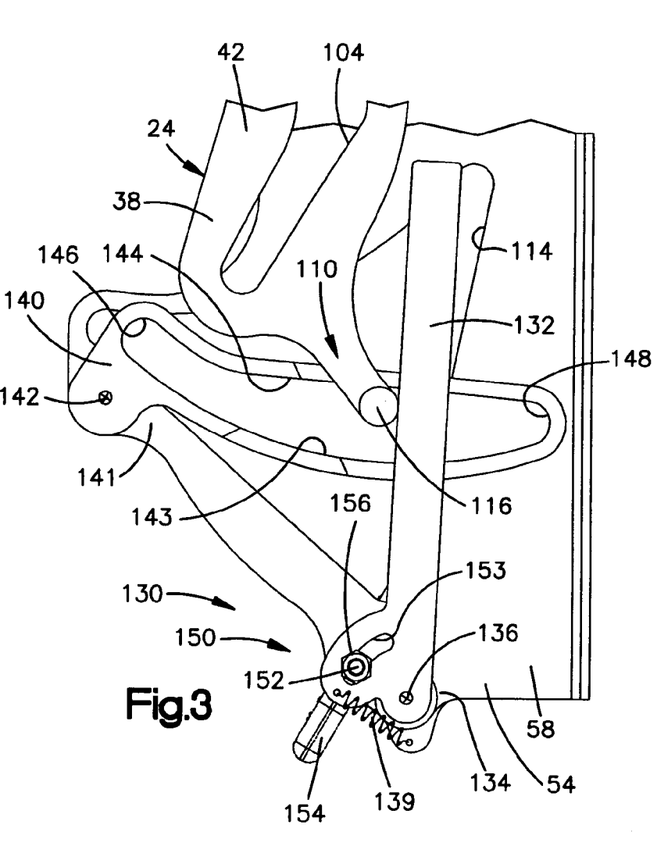
FIG. 3 is a side view of the memory mechanism of FIG. 2.

A first exemplary embodiment of a memory mechanism 130 is illustrated in FIGS. 2-3. The memory mechanism 130 may define a memory position of the support 24 relative to the mounting bracket 54. The memory position may be any one of the plurality of positions of the support 24 relative to the mounting bracket 54. The memory mechanism 130 may also define a second range of motion of the support 24 relative to the mounting bracket 54 that is smaller than the first range of motion. An operator may manually set or activate the memory mechanism 130 once the memory position is selected. The support 24 may be easily moved back to the memory position if the support 24 is moved from the memory position and the memory mechanism 130 is activated.

The memory mechanism 130 may guide movement of the support 24 relative to the mounting bracket 54 between the first position, such as the storage position, and the memory position. The memory mechanism 130 may have a first position in which the support 24 is movable relative to the mounting bracket 54 into any one of the plurality of positions relative to the mounting bracket through the entire first range of motion. The memory mechanism 130 may have a second position in which the support 24 is only movable relative to the mounting bracket 54 through the second range of motion. The second range of motion may be defined by the memory mechanism 130 and may extend between the first position and the memory position.

The memory mechanism 130 may include a stop member 132 that partially defines the memory position and the second range of motion. The stop member 132 may be engageable with the guide portion 116 of the support 24. The stop member 132 may be pivotally connected to a first portion 134 of the mounting bracket 54. A pin 136 may extend through one end of the stop member 132, a washer 138 between the stop member and the side wall 58, and the side wall 58 to pivotally connect the stop member 132 to the mounting bracket 54. The stop member 132 may move relative to the mounting bracket 54 in response to movement of the guide portion 116 relative to the mounting bracket 54 when the memory mechanism has not been activated.

A spring 139 may urge the stop member 132 to pivot into engagement with the guide portion 116 of the support 24. The spring 139 may have one end connected with the stop member 132 and an opposite end connected with the mounting bracket 54. Accordingly, the stop member 132 may remain in engagement with the guide portion 116 of the support 24 when the memory mechanism 130 is in the first position.

The memory mechanism 130 may include a memory guide member 140 that partially defines the memory position and the second range of motion. The guide member 140 may be pivotally connected to a second portion 141 of the mounting bracket 54 by a pin 142. The second portion 141 may be spaced from the first portion 134. The guide member 140 may be movable relative to the mounting bracket 54 and the stop member 132. The guide member 140 may extend between the side wall 58 of the mounting bracket 54 and the stop member 132.

The guide portion 116 of the support 24 may extend into a slot 143 in the guide member 140. The guide portion 116 may engage side surfaces 144 defining the slot 143 to guide movement of guide portion 116 along the slot when the memory mechanism 130 is in the second position. The guide member 140 may move relative to the mounting bracket 54 and the stop member 132 in response to movement of the guide portion 116 relative to the mounting bracket 54 when the memory mechanism 130 is in the first position. The guide portion 116 may be located in a first end 146 of the slot 143 when the support 24 is in the first position. The guide portion 116 may move between the first end 146 of the slot 143 and a second end 148 of the slot as the support 24 moves relative to the mounting bracket 54.

A manually actuatable memory lock 150 may prevent movement of the stop member 132 and the memory guide member 140 relative to the mounting bracket 54. The memory lock 150 may have a first position (shown in dot-dash lines in FIG. 1) preventing movement of the stop member 132 and the guide member 140 relative to the mounting bracket 54 to define the memory position and the second range of motion. The memory lock 150 may have a second position (shown in solid lines in FIG. 1) permitting movement of the stop member 132 and the guide member 140 relative to the mounting bracket 54.

The memory lock 150 (FIG. 2) may include a locking shaft 152 that extends through the side wall 58 and an arcuate slot 153 in the stop member 132. A manually engageable memory lock lever 154 may be fixedly connected to one end of the locking shaft 152 and engage the side wall 58 of the mounting bracket 54. A nut 156 may threadably engage a second end of the locking shaft 152 and engage the stop member 132. The stop member 132, the guide member 140 and the side wall 58 may be clamped between the memory lock lever 154 and the nut 156 when the memory lock 150 is in the second position to prevent movement of the stop member and the guide member relative to the mounting bracket 54 and define the memory position. The memory lock lever 154 may be rotated relative to the nut 156 to move the memory lock 150 between its first and second positions. It is contemplated that any suitable memory lock may be used to prevent movement of the stop member 132 and the guide member 140 relative to the mounting bracket 54.

When the memory lock 150 is in its first position and the locking mechanism 80 is in its first position, an operator of the vehicle may adjust the support 24 into any desired position within the first range of motion relative to the mounting bracket 54. The stop member 132 and the memory guide member 140 may move with the guide portion 116 of the support 24 relative to the mounting bracket 54 during movement of the support relative to the mounting bracket. The operator may then activate the locking mechanism 80 to prevent movement of the support 24 relative to the mounting bracket 54.

The operator may then manually move the memory lock 150 from its first position into its second position to define the memory position at the second range of motion. The second range of motion may extend along the slot 143 in the guide member 140 between the first end 146 of the slot and the stop member 132. When the operator of the vehicle moves the locking mechanism 80 from its second position into its first position with the memory lock 150 in its second position, the support 24 may only move relative to the mounting bracket 54 over the second range of motion between the memory position and the first position. Accordingly, the operator may easily return the support 24 to the memory position since the guide member 140 guides the support back to the memory position.

Figure 4:
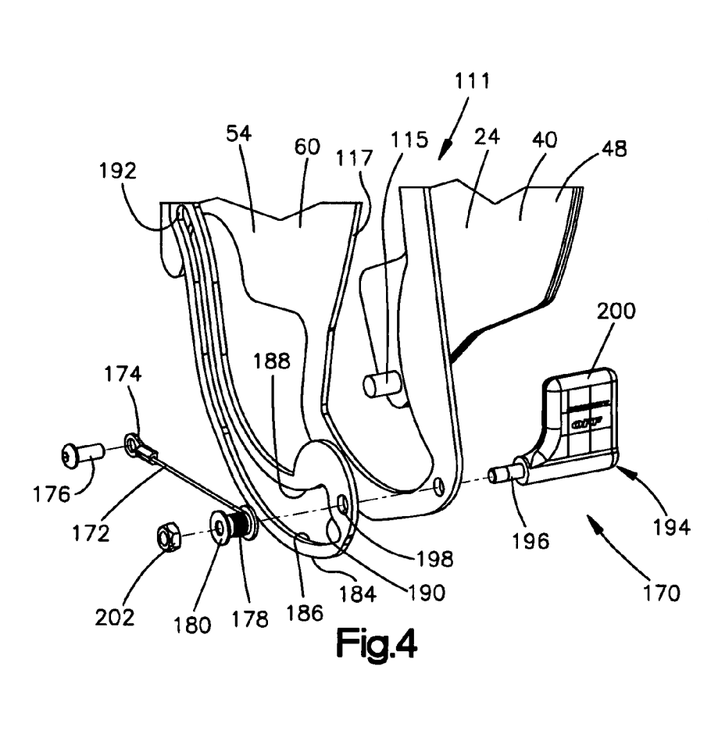
FIG. 4 is an exploded view of a second exemplary embodiment of a memory mechanism for use with a steering column.
Figure 5:
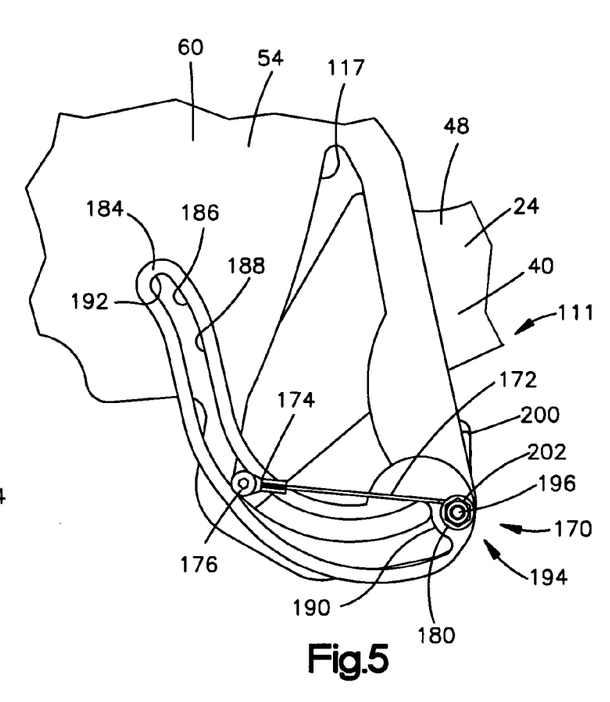
FIG. 5 is a side view of the memory mechanism of FIG. 4.

A second exemplary embodiment of a memory mechanism 170 is illustrated in FIGS. 4-5. The memory mechanism 170 may define a memory position of the support 24 relative to the mounting bracket 54. The memory position may be any one of the plurality of positions of the support 24 relative to the mounting bracket 54. The memory mechanism 170 may also define a second range of motion of the support 24 relative to the mounting bracket 54 that is smaller than a first range of motion defined by a first mechanism 111. The first mechanism 111 may include a guide portion 115 of the support 24 and an opening 117 in the side wall 60 of the mounting bracket 24. An operator may set or activate the memory mechanism 170 once the memory position is selected. The support 24 may be easily moved back to the memory position if the support 24 is moved from the memory position and the memory mechanism 170 is activated.

The memory mechanism 170 may guide movement of the support 24 relative to the mounting bracket 54 between the first position, such as the storage position, and the memory position. The memory mechanism 170 may have a first position in which the support 24 is movable relative to the mounting bracket 54 into any one of a plurality of positions relative to the mounting bracket through the entire first range of motion. The memory mechanism may have a second position in which the support 24 is only movable relative to the mounting bracket 54 through the second range of motion. The second range of motion may be defined by the memory mechanism 170 and may extend between the first position and the memory position.

The memory mechanism 170 may include a stop member 172 that partially defines the memory position and the second range of motion. The stop member 172 may be a flexible member, such as a cable, with a first end 174 pivotally connected to the guide portion 115 of the support 24 by a fastener 176. A second end 178 of the stop member 172 may be wrapped around a spool member 180 rotatably connected to the mounting bracket 54. The stop member 172 and the spool member 180 partially define the memory position and the second range of motion. The stop member 172 may move relative to the mounting bracket 54 in response to movement of the guide portion 115 relative to the mounting bracket 54. A spring (not shown) may be connected with the spool 180 to urge the stop member 172 to wind onto the spool. When the memory mechanism 170 is in the first position, the spool 180 may rotate relative to the mounting bracket 54 to permit the stop member 172 to be unwound from the spool and wound onto the spool as the support 24 is moved relative to the mounting bracket. When the memory mechanism 170 is in the second position, the spool member 180 is prevented from rotating relative to the mounting bracket 54 so that the stop member 172 cannot be unwound from the spool or wound onto the spool.

The memory mechanism 170 may include a memory guide member 184 that partially defines the memory position and the second range of motion. The guide member 184 may be pivotally connected to the mounting bracket 54. The guide portion 115 of the support 24 may extend into a slot 186 in the guide member 184. The guide portion 115 may engage side surfaces 188 defining the slot 186 to guide movement of the guide portion along the slot when the memory mechanism 170 is in the second position. The guide member 184 may move relative to the mounting bracket 54 in response to movement of the guide portion 115 relative to the mounting bracket 54 when the memory mechanism 170 is in the first position. The guide portion 115 may be located in a first end 190 of the slot 186 when the support 24 is in the first position. The guide portion 115 may move between the first end 190 and a second end 192 of the slot 186 as the support 24 moves relative to the mounting bracket 54.

A manually actuatable memory lock 194 may prevent movement of the spool member 180 and the memory guide member 184 relative to the mounting bracket 54. The memory lock 194 may have a first position (shown in dot-dash lines in FIG. 5) preventing movement of the spool member 180 and the guide member 184 relative to the mounting bracket 54 to define the memory position and the second range of motion. The memory lock 194 may have a second position (shown in solid lines in FIG. 5) permitting movement of the spool 180 and the guide member 184 relative to the mounting bracket 54.

The memory lock 194 may include a locking shaft 196 that extends through an opening 198 in the guide member 184 and the side wall 60 of the mounting bracket 54. A manually engageable memory lock lever 200 may be fixedly connected to one end of the locking shaft 196 and engage the side wall 60 of the mounting bracket 54. A nut 202 may threadably engage a second end of the locking shaft 196 and engage the spool member 180. The locking shaft 196 may rotatably connect the spool member 180 to the mounting bracket 54 and also pivotally connect the guide member 184 to the mounting bracket. The spool member 180, the guide member 184 and the side wall 58 may be clamped between the memory lock lever 200 and the nut 202 when the memory lock 200 is in the second position to prevent movement of the spool member and the guide member relative to the mounting bracket 54 and define the memory position. The memory lock lever 200 may be rotated relative to the nut 202 to move the memory lock 194 between its first and second positions. It is contemplated that any suitable memory lock may be used to prevent movement of the spool 180 and the guide member 184 relative to the mounting bracket.

When the memory lock 200 is in its first position and the locking mechanism 80 is in its first position, an operator of the vehicle may adjust the support 24 into any desired position within the first range of motion relative to the mounting bracket 54. The stop member 172 and the memory guide member 184 may move with the guide portion 115 of the support 24 relative to the mounting bracket 54 during movement of the support relative to the mounting bracket. The operator may then activate the locking mechanism 80 to prevent movement of the support 24 relative to the mounting bracket 54.

The operator may then manually move the memory lock 194 from its first position into its second position to define the memory position and the second range of motion. The second range of motion may extend along the slot 186 in the guide member 184 from the first end 190 of the slot to a distance from the first end approximately equal to the length of the stop member 172 that has been unwound from the spool member 180. When the operator of the vehicle moves the locking mechanism 80 from its second position into its first position with the memory lock 170 in its second position, the support 24 may only move relative to the mounting bracket 54 between the memory position and the first, out of the way position. Accordingly, the operator may easily return the support 24 to the memory position since the guide member 184 guides the support back to the memory position.

Although the memory mechanisms 130 and 170 have been described for use with an exemplary steering column 10, it is contemplated that the memory mechanisms may be used with any desired steering column. More specifically, the memory mechanisms 130 and 170 may be used with a steering column having any desired locking mechanism.

From the above description of the invention, those skilled in the art will perceive improvements, changes and modifications. Such improvements, changes and modifications within the skill of the art are intended to be covered by the appended claims.

Having described the invention, the following is claimed:

1. A steering column for a vehicle comprising:
a steering column member connectable with a steering wheel and rotatable to turn steerable vehicle wheels;
a mounting bracket which connects said steering column to a vehicle frame;
a support connected with said mounting bracket and through which said steering column member extends, said support supporting said steering column member for rotation about a longitudinal axis of said steering column member, said support being movable relative to said mounting bracket into any one of a plurality of positions, said support having a first position relative to said mounting bracket, said first position being one of said plurality of positions;

a locking mechanism having an unlocked position that allows said support to move relative to said mounting bracket into any one of said plurality of positions, said locking mechanism having a locked position that locks said support in any one of said plurality of positions relative to said mounting bracket; and a memory mechanism spaced from said locking mechanism which defines a memory position of said support relative to said mounting bracket, said memory position being any one of said plurality of positions of said support relative to said mounting bracket, said memory mechanism guiding movement of said support relative to said mounting bracket between said first position and said memory position, said memory mechanism having a first position and a second position, said support being movable relative to said mounting bracket into any one of the plurality of positions relative to said mounting bracket when said memory mechanism is in said first position and said locking mechanism is in said unlocked position, said support being movable relative to said mounting bracket only between said first position of said support and said memory position when said memory mechanism is in said second position and said locking mechanism is in said unlocked position.

2. A steering column as set forth in claim 1 wherein said memory mechanism includes a first member for at least partially defining said memory position, said first member being engageable with said support and being movable relative to said mounting bracket, a memory lock prevents movement of said first member relative to said mounting bracket to define said memory position.

3. A steering column as set forth in claim 2 wherein said first member has a slot into which a portion of said support extends, said portion of said support being movable relative to said first member along said slot, said portion of said support being engageable with surfaces defining said slot in said first member.

4. A steering column as set forth in claim 3 wherein said portion of said support is engageable with said mounting bracket to limit movement of said support relative to said mounting bracket.

5. A steering column as set forth in claim 3 wherein a second member is engageable with said portion of said support to limit movement of said portion along said slot.

6. A steering column as set forth in claim 5 wherein said second member is movable relative to said mounting bracket and said first member.

7. A steering column as set forth in claim 6 wherein said second member is biased toward engagement with said portion of said support.

8. A steering column as set forth in claim 6 wherein said memory lock prevents movement of said first and second members relative to said mounting bracket to define said memory position.

9. A steering column as set forth in claim 6 wherein said second member includes a flexible member with a first end connected to said portion of said support and a second end wrapped around a spool member, said spool member being rotatable relative to said mounting bracket.

10. A steering column as set forth in claim 9 wherein said spool member is biased to wind said flexible member onto said spool member.

11. A steering column as set forth in claim 9 wherein said memory lock prevents movement of said first member and said spool member relative to said mounting bracket to define said memory position.

12. A steering column as set forth in claim 2 including a second member for at least partially defining said memory position, said second member being movable relative to said mounting bracket and said first member, said memory lock preventing movement of said first and second members relative to said mounting bracket.

13. A steering column as set forth in claim 12 wherein said support is engageable with said first and second members.

14. A steering column as set forth in claim 13 wherein one of said first and second members is biased into engagement with said support.

15. A steering column as set forth in claim 12 wherein said first and second members are pivotally connected to said mounting bracket.

16. A steering column as set forth in claim 15 wherein said first member is pivotally connected to a first portion of said mounting bracket and said second member is pivotally connected to a second portion of said mounting bracket.

17. A steering column as set forth in claim 12 wherein said memory lock includes a locking shaft extending through at least one of said first and second members.

18. A steering column as set forth in claim 17 wherein said memory lock engages said second member and is spaced from said first member.

19. A steering column as set forth in claim 17 wherein said locking shaft extends through a slot in said second member.

20. A steering column as set forth in claim 17 wherein said memory lock engages said first and second members.

21. A steering column as set forth in claim 17 wherein said locking shaft extends through said first and second members.

22. A steering column as set forth in claim 21 wherein said second member is rotatable relative to said locking shaft, a first end of a flexible member being connected to said support and a second end of said flexible member being wrapped around said second member.

23. A steering column as set forth in claim 12 wherein said memory lock prevents movement of said first and second members relative to said mounting bracket.

24. A steering column as set forth in claim 1 wherein said memory mechanism includes a manually actuatable handle for moving said memory mechanism between said first and second positions.

25. A steering column as set forth in claim 1 wherein a member urges said support toward said first position.

26. A steering column as set forth in claim 1 wherein said support is pivotally connected with a pivot member, said pivot member being pivotally connected with said mounting bracket, said locking mechanism preventing pivotal movement of said support relative to said pivot member and pivotal movement of said pivot member relative to said mounting bracket.

27. A steering column comprising:
a steering column member connectable with a steering wheel and rotatable to turn steerable vehicle wheels;
a mounting bracket which connects said steering column to a vehicle frame;
a support connected with said mounting bracket and through which said steering column member extends, said support supporting said steering column member for rotation about a longitudinal axis of said steering column member and being movable relative to said mounting bracket;

a first mechanism that defines a first range of motion of said support relative to said mounting bracket;

a locking mechanism having an unlocked position that allows said support to move relative to said mounting bracket through at least the entire first range of motion and a locked position that prevents movement of said support relative to said mounting bracket; and a second mechanism spaced from said locking mechanism that defines a second range of motion of said support relative to said mounting bracket, said second range of motion being smaller than said first range of motion, said second range of motion being part of said first range of motion, said second mechanism having a first position and a second position, said support being movable relative to said mounting bracket through the entire first range of motion when said second mechanism is in said first position and said locking mechanism is in said unlocked position, said support being movable relative to said mounting bracket only through the second range of motion when said second mechanism is in said second position and said locking mechanism is in said unlocked position.

28. A steering column as set forth in claim 27 wherein said second mechanism includes a first member for at least partially defining said second range of motion, said first member being engageable with said support and being movable relative to said mounting bracket, a lock prevents movement of said first member relative to said mounting bracket to define said second range of motion.

29. A steering column as set forth in claim 28 wherein said first member has a slot into which a portion of said support extends, said portion of said support being movable relative to said first member along said slot, said portion of said support being engageable with surfaces defining said slot in said first member.

30. A steering column as set forth in claim 29 wherein said portion of said support is engageable with said mounting bracket to define said first range of motion.

31. A steering column as set forth in claim 29 wherein a second member is engageable with said portion of said support to limit movement of said portion along said slot and define said second range of motion.

32. A steering column as set forth in claim 31 wherein said second member is movable relative to said mounting bracket and said first member.

33. A steering column as set forth in claim 32 wherein said second member is biased toward engagement with said portion of said support.

34. A steering column as set forth in claim 32 wherein said lock prevents movement of said first and second members relative to said mounting bracket to define said second range of motion.

35. A steering column as set forth in claim 32 wherein said second member includes a flexible member with a first end connected to said portion of said support and a second end wrapped around a spool member, said spool member being rotatable relative to said mounting bracket.

36. A steering column as set forth in claim 35 wherein said spool member is biased to wind said flexible member onto said spool member.

37. A steering column as set forth in claim 35 wherein said lock prevents movement of said first member and said spool member relative to said mounting bracket to define said second range of motion.

38. A steering column as set forth in claim 28 including a second member for at least partially defining said second range of motion, said second member being movable relative to said mounting bracket and said first member, said lock preventing movement of said first and second members relative to said mounting bracket.

39. A steering column as set forth in claim 38 wherein said lock includes a locking shaft extending through at least one of said first and second members.

40. A steering column as set forth in claim 39 wherein said lock engages said second member and is spaced from said first member.

41. A steering column as set forth in claim 40 wherein said locking shaft extends through a slot in said second member.

42. A steering column as set forth in claim 39 wherein said lock engages said first and second members.

43. A steering column as set forth in claim 42 wherein said locking shaft extends through said first and second members.

44. A steering column as set forth in claim 43 wherein said second member is rotatable relative to said locking shaft, a first end of a flexible member being connected to said support and a second end of said flexible member being wrapped around said second member.

45. A steering column as set forth in claim 27 wherein said second mechanism includes a manually actuatable handle for moving said second mechanism between said first and second positions.

* * * * *

UNITED STATES PATENT AND TRADEMARK OFFICE
CERTIFICATE OF CORRECTION

PATENT NO. : 7,584,996 B2
APPLICATION NO. : 11/440637
DATED : September 8, 2009
INVENTOR(S) : Mark A. Cartwright It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 377 days.

Signed and Sealed this

Fourteenth Day of September, 2010

David J. Kappos
*Director of the United States Patent and Trademark Office*